United States Patent [19]
Stephens

[11] Patent Number: 5,421,681
[45] Date of Patent: Jun. 6, 1995

[54] BORING TOOL HAVING ADJUSTABLE CUTTER ELEMENTS

[75] Inventor: Raymond A. Stephens, Sterling Hts., Mich.

[73] Assignee: Valenite Inc., Madison Heights, Mich.

[21] Appl. No.: 164,867

[22] Filed: Dec. 10, 1993

[51] Int. Cl.⁶ .................................... B23B 29/034
[52] U.S. Cl. ................................. 408/168; 408/180; 408/188
[58] Field of Search ............... 408/156, 158, 159, 161, 408/168, 171, 180, 187, 188

[56] References Cited
U.S. PATENT DOCUMENTS

| | | | |
|---|---|---|---|
| 3,296,898 | 1/1967 | Osborn, Jr. | 408/159 |
| 3,749,508 | 7/1973 | Schukrafft | 408/156 |
| 4,351,207 | 9/1982 | Werth, Jr. | 408/156 |
| 4,773,801 | 9/1988 | Noggle | 408/180 |
| 4,979,852 | 12/1990 | Noggle | 408/156 |
| 5,193,954 | 3/1993 | Hunt | 409/234 |
| 5,203,856 | 4/1993 | Stephens | 408/180 |

*Primary Examiner*—Steven C. Bishop

[57] ABSTRACT

A boring bar in which a cutter element holder is adjustable around a transverse pivot axis, so that different cutting elements can be used to machine the hole surface during movement of the boring bar in opposite directions. The transverse pivot axis is defined by a torsional hinge that automatically returns the holder to a neutral position when the adjustment force is removed.

14 Claims, 3 Drawing Sheets

BORING TOOL HAVING ADJUSTABLE CUTTER ELEMENTS

BACKGROUND OF THE INVENTION

This invention relates to a boring tool having at least two cutter elements that can be adjusted to achieve two cutting actions. During insertional movement of the tool into a hole in a work piece one (or more) of the cutter elements will machine the hole surface to a desired dimension; during retractive movement of the tool out of the hole another one of the cutter elements will perform a further machining operation, to form a precision finish hole surface. The boring tool is equipped with means for transversely adjusting the cutter elements through a fixed incremental distance when the tool is at the bottom of the hole, whereby the final hole surface has a desired degree of precision.

The invention makes use of constructions disclosed in U.S. Pat. No. 4,773,801 issued to K. G. Noggle on Sep. 27, 1988, and U.S. Pat. No. 5,193,954 issued to Carl Hunt on Mar. 16, 1993.

U.S. Pat. No. 4,773,801 discloses a boring tool wherein a relatively small diameter boring bar is joined to a larger diameter tool body by a plate that is bolted near its outer edge to an end face of the tool body. Two arcuate slots are formed through said plate a slight distance inwardly from the bolted area. These arcuate slots form two diametrically spaced neck sections that form a transverse pivot axis extending normal to the tool rotational axis.

An adjustment device is mounted on the tool body to apply a force to the plate, such that a central section of the plate can be tilted around the transverse pivot axis so as to incrementally move the cutter elements on the boring bar toward or away from the tool rotational axis. The adjustment structure is capable of achieving precise adjustments in the cutter element position, while at the same time providing a desired resistance against cutter element chatter or vibration.

U.S. Pat. No. 5,193,954 discloses a mechanism for releasably clamping a cutter element holder to a cutting machine or spindle. The mechanism comprises a housing having a frusto-conical socket for receiving a tubular section of the cutter element holder. The tubular section is releasably clamped or wedged in the socket by multiple wedge lock elements that are mounted within the housing for radial movements toward or away from an annular shoulder formed on the inner surface of the tubular section.

As the wedge lock elements move radially outwardly they abut the annual shoulder on the tubular section of the cutter element holder, thereby moving the cutter element holder further into the socket. The cutter element is thus firmly, but releasably, clamped to the cutting machine or spindle. An axially movable drawbar is provided for operating the wedge lock elements to their clamped or unclamped positions.

SUMMARY OF THE INVENTION

The present invention combines structural features disclosed in U.S. Pat. Nos. 4,773,801 and 5,193,954, to achieve a boring tool that has a first cutting action during insertional movement into a hole in a work piece, and a different action during retractive movement out of the hole. While the tool cutter elements are at the bottom of the hole the tool body is adjusted to bring a new cutter element into position for performing a finish machining operation during retractive movement of the tool out of the hole. The adjustment structures are capable of automated control, such that the two directional machining process can be carried out automatically without human assistance or oversight.

A boring tool embodying the invention comprises a boring bar having a clamping unit therein for releasably mounting a cutter element holder on the free end of the bar; the clamping unit comprises wedge lock cam elements operable by an axial rod that can be moved back and forth by automatic means, whereby the cutter element holder can be replaced, as needed, without lost production time.

The clamping unit comprises a mounting flange bolted to an end face of the boring bar, and two arcuate slots near the inner limit of the flange, such that two diametrically-spaced neck sections are formed in the plane of the mounting flange. The neck sections form a transverse pivot axis that enables the clamping unit to pivot or tilt in either direction from a neutral unstressed position; the neck sections form torsional hinge connections that automatically return the clamping unit to its unstressed condition when the adjustment forces are removed. The adjustment structure preferably comprises an axial sleeve having cam means thereon, and cam follower means carried on the clamping unit within the space circumscribed by the sleeve. The sleeve can be moved back and forth to tilt the clamping unit in either direction from its neutral position.

Two or more cutter elements are mounted on the cutter element holder. In the neutral position of the clamping unit the cutter elements are located within the space circumscribed by a hole that is to be machined. Prior to insertional motion of the tool into the hole in the work piece the clamping unit is tilted in one direction to bring at least one of the cutter elements into position for machining the hole surface while the tool is being inserted into the hole.

When the cutter elements reach the bottom of the hole, the cam type adjustment means is operated to tilt the clamping unit in the opposite direction so as to bring a different cutter element into position for machining the hole surface while the tool is being drawn out of the hole.

The mechanisms for clamping the cutter element holder in the clamping unit, and for tiltably adjusting the clamping unit are capable of automated control, such that a precision machining operation can be carried out expeditiously without human attention or supervision.

THE DRAWINGS

DESCRIPTION OF A PREFERRED EMBODIMENT OF THE INVENTION

Figure 1:
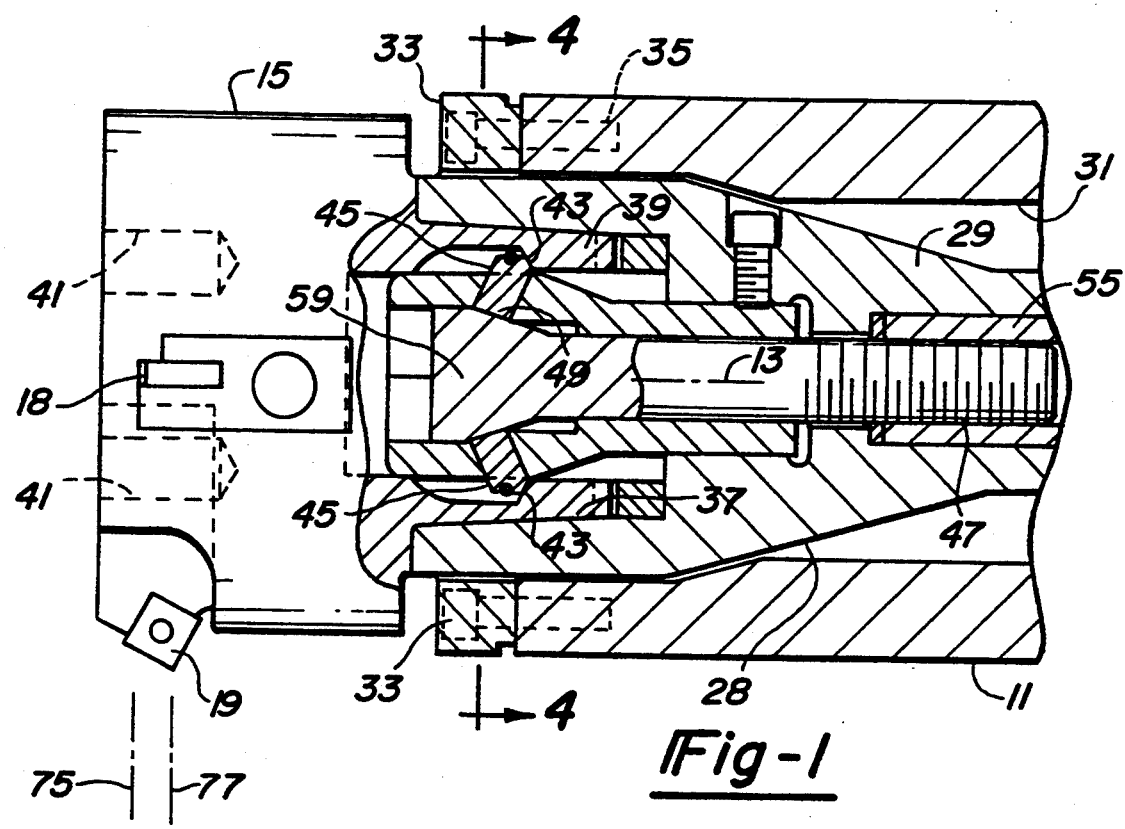
FIG. 1 is a fragmentary sectional view of a boring tool constructed according to the invention.

FIG. 1 shows a boring tool that comprises a boring bar 11 adapted to be inserted into a hole in a work piece to perform a machining operation thereon. The bar can be stationary, in which case the work will be rotating. Alternately the bar can be rotating around its central longitudinal axis 13. The bar will ordinarily be movable axially into and out of the hole in the work piece; alternatively the bar can be fixed axially, and the work piece moved axially.

Figure 2:
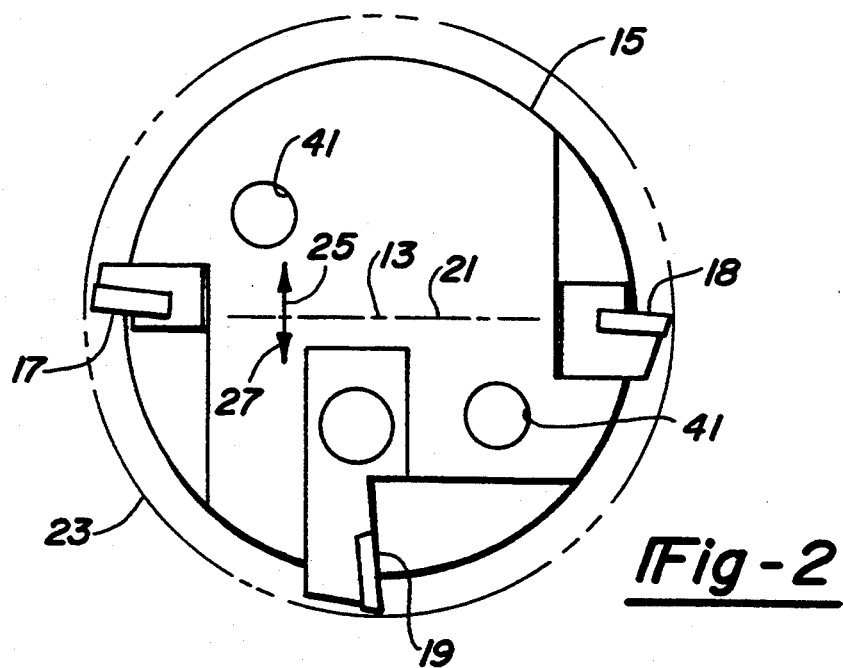
FIG. 2 is a left end view of the tool shown in FIG. 1.

A generally cylindrical cutter element holder 15 is releasably clamped to bar 11 at its left end. Holder 15 carries three separate cutter elements 17, 18 and 19 (FIG. 2). Cutter elements 17 and 18 are located generally on an imaginary diametrical line 21 extending through the tool longitudinal axis 13. Cutter element 19 is located on an imaginary radial line extending normal to diametrical line 21.

The cutting tips of the three cutter elements can be located the same distance away from central axis 13. Alternately the tips of the three cutter elements can be radially spaced slightly different distances from axis 13. For example the tip of cutter element 17 can be closest to axis 13, and the tip of cutter element 19 can be the furthest away from axis 13.

For reference purposes there is shown in FIG. 2 a circle 23 representing a hole to be machined. None of the cutter elements is in position to machine the hole surface. However, if holder 15 is moved upwardly, as indicated by arrow 25, the two cutter elements 17 and 18 will then be in position to machine the hole surface. If holder 15 is moved downwardly, as indicated by arrow 27, cutter element 19 will be in position to machine the hole surface.

FIG. 2 represents a neutral position of the cutter element holder. Prior to insertional movement of the boring bar into the work piece the cutter element holder will be adjusted upwardly, as denoted by arrow 25, to position cutter elements 17 and 18 for machining operations on the hole surface. When the cutter elements reach the end (bottom) of the hole, holder 15 will be adjusted downwardly, as denoted by arrow 27, to locate cutter element 19 for machining the hole surface during retractive motion of the boring bar out of the hole. The tool structure of FIGS. 1 through 6 includes adjustment devices designed to achieve the adjustments denoted by arrows 25 and 27 in FIG. 2.

FIG. 1 shows a means for releasably clamping the cutter element holder 15 in the boring bar 11. The clamping means is constructed generally similarly to the clamping means shown in aforementioned U.S. Pat. No. 5,193,954. Particular details of the clamping means are shown and described in that patent.

Figure 4:
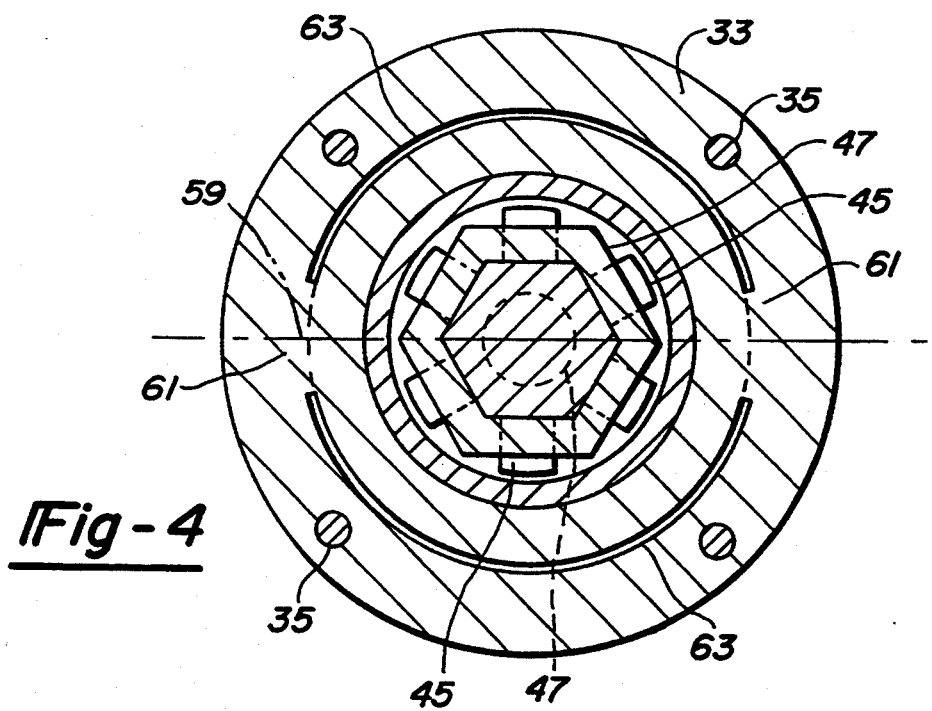
FIG. 4 is a transverse sectional view taken on line 4—4 in FIG. 1.

The clamping unit 28 herein shown, comprises a housing 29 located within a cavity 31 in boring bar 11. The clamping unit includes a mounting flange 33 that is secured to the end face of bar 11 by four bolts 35 (FIG. 4). Housing 29 defines a frustoconical socket 37 that is adapted to receive therein a tubular section 39 of the cutter element holder 15. The holder can be inserted into socket 37 automatically by pick-up means, not shown. The pick-up means can include fingers insertable into holes 41 in holder 15 for transporting the holder into or out of the socket 37 (from or to a tool storage means).

The inner side surface of tubular section 39 forms an annular shoulder 43 that is adapted to be engaged by six radially movable wedge lock elements 45. Lock elements 45 are shown in their locked positions abutting shoulder 43 and clamping the holder 15 in socket 37. An axially movable rod 47 has an enlarged head formed to provide flat cam surfaces 49 engageable with the inner ends of wedge lock elements 45, whereby rightward linear motion of the rod moves the lock elements outwardly to the FIG. 1 position. Leftward linear motion of the rod moves the wedge lock elements inwardly to positions wherein holder 15 is free for withdrawal from socket 37.

Figure 3:
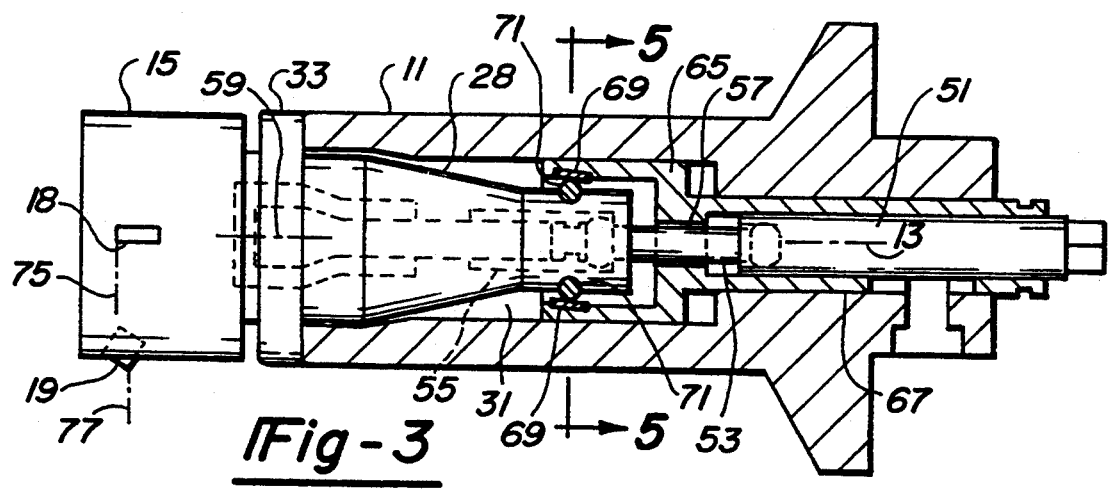
FIG. 3 is a view on a reduced scale and partly in section, showing the FIG. 1 tool.
Figure 6:
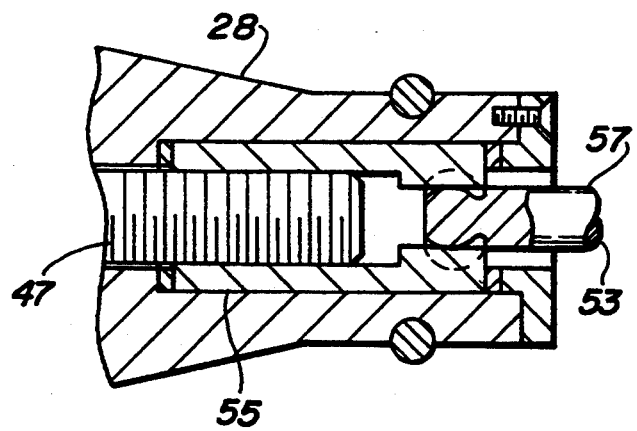
FIG. 6 is a fragmentary sectional view showing a structural detail used in the tool of FIG. 3

FIGS. 3 and 6 illustrate a mechanism for moving rod 47 axially back and forth. The mechanism includes a rotary shaft 51 having a universal drive connection 53 with an elongated nut 55. The nut rotates to move rod 47 linearly (axially) for operating the clamp elements 45.

Figure 5:
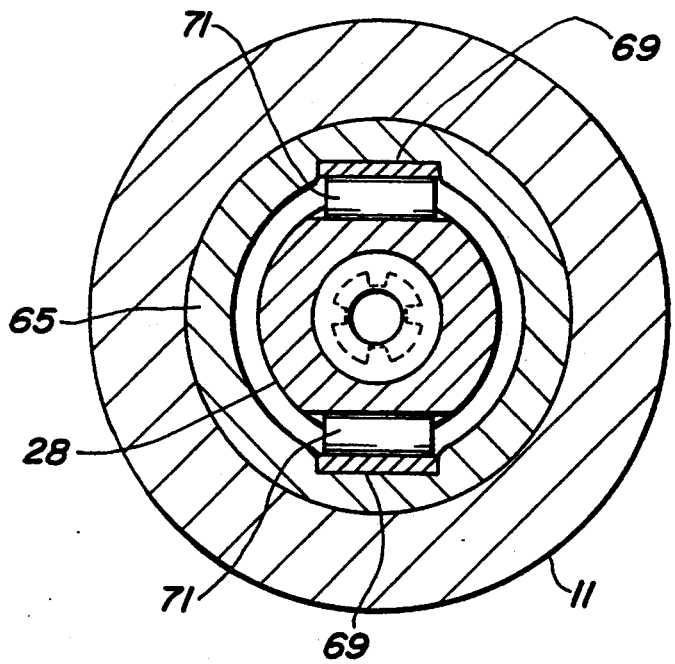
FIG. 5 is an enlarged transverse sectional view taken on line 5—5 in FIG. 3.

Drive connection 53 is designed to permit the axis of nut 55 to be slightly oblique to the axis of shaft 51, without disturbing the drive connection. Such obliqueness of the nut axis can occur when the clamping unit (housing 29) is tilted to achieve the adjustments denoted by arrows 25 and 27 (FIG. 2). Drive connection 53 comprises a pin 57 having spherical ends engaged respectively with interior surfaces on shaft 51 and nut 55. Grooves are formed in the spherical surfaces to mate with ribs on the associated components, whereby rotary driving connections are established while permitting limited rocking around the sphere centers. FIGS. 5 and 6 show generally one method of forming the drawing connection. Other types of universal drive connections (or universal joints) can be used.

In order to achieve the adjustments denoted by arrows 25 and 27 (FIG. 2), the clamping unit 28 is constructed so as to be tiltable around a transverse axis 59 (FIG. 4). Axis 59 is formed by two diametrically spaced neck sections 61 in the plane of mounting flange 33. Two arcuate slots 63 extend through flange 33 where the flange joins housing 29, such as to form the neck sections 61 shown in FIG. 4. The widths of neck sections 61 are selected so that the neck sections form torsional hinges between flange 33 and housing 39, whereby the housing can be turned around the defined axis 59. The pivot (torsional hinge connection) is similar to that shown in aforementioned U.S. Pat. No. 4,773,801.

FIGS. 3 and 5 show an adjustment mechanism for incrementally swinging the housing 29 around transverse pivot axis 59. The adjustment mechanism comprises an axially movable sleeve 65 connected to an actuation tube 67. Two flat plates 69 are mounted in the sleeve to extend parallel to pivot axis 59, and oblique to the longitudinal axis of the boring bar; plates 69 form flat cam surfaces.

Housing 29 carries two parallel cylindrical pins 71 that are in slidable contact with the flat surfaces of plates 69. Pins 71 form cylindrical cam follower surfaces. As viewed in FIG. 3, leftward motion of sleeve 65 causes cam elements 69 to move housing 29 in a clockwise arc around transverse pivot axis 59, thereby achieving the upward adjustment denoted by numeral 25 in FIG. 2. Rightward motion of sleeve 65 (from the FIG. 3 position) produces a counterclockwise arcuate motion around pivot axis 59.

A suitable servo device will be connected to tube 67 to produce the necessary motion of sleeve 65 prior to operation of the boring bar for machining purposes.

Figure 7:
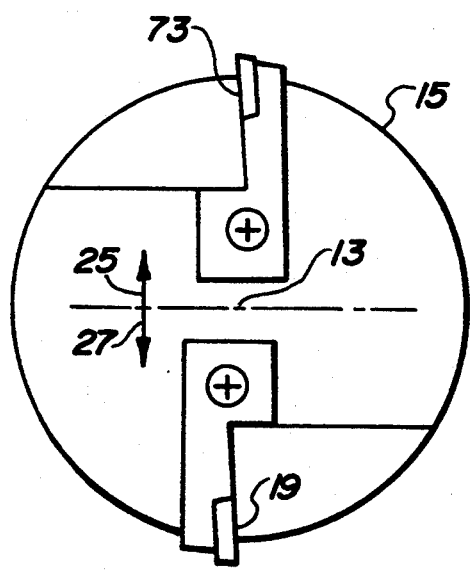
FIG. 7 is a view taken in the same direction as FIG. 2, but showing a different cutter element arrangement that can be used in practice of the invention.

FIG. 7 shows a cutter element arrangement that can be used in lieu of the arrangement depicted in FIG. 2. As shown in FIG. 7, there is an upper cutter element 73 and a lower cutter element 19. Downward adjustment of holder 15 brings cutter element 19 into play. Upward adjustment of holder 15 brings cutter element 73 into play.

The cutting planes of the cutter elements are preferably offset in the axial direction as viewed e.g. in FIG. 1 or FIG. 3. Thus, the cutting plane 75 for cutter element 18 is offset slightly to the left of the cutting plane 77 for cutter element 19.

The drawings show specific forms that the invention can take. However, it will be appreciated that the invention can take other forms.

What is claimed is:

1. A boring tool comprising a boring bar having a longitudinal axis, an end face transverse to said axis, and a longitudinal cavity extending axially from said face; a clamping unit located within said cavity, said clamping unit comprising a housing having an axial socket therein and a mounting flange secured to said end face; a cutter holding means insertable into said socket for fixed disposition relative to the boring bar; a plurality of cutter elements projecting from said holding means away from said longitudinal axis; means for opening and closing said clamping unit to release or clamp the cutter holding means; said means for opening and closing said clamping unit comprised of a threaded rod nominally located on said longitudinal axis, and a rotary nut operable to move said rod axially; and means for tilting the clamping unit around an axis transverse to said longitudinal axis; said boring bar adapted for axial insertion into, and return movement out of, a hole in a work piece to perform a boring operation; said means for tilting the clamping unit being operable so that during insertional movement of the boring bar into the work piece a first one of said cutter elements performs a machining operation, and during return movement of the boring bar out of the work piece a second one of said cutter elements performs a machining operation.

2. The boring tool of claim 1, wherein said means for tilting the clamping unit comprises an axially movable sleeve concentric with the boring bar longitudinal axis.

3. The boring tool of claim 2, wherein said means for tilting the clamping unit further comprises cam follower means carried by the clamping unit and cam means carried by said axially movable sleeve.

4. The boring tool of claim 3, wherein said cam means comprises two flat surfaces extending parallel to said transverse axis on opposite sides of the boring bar longitudinal axis; said flat surfaces being parallel to each other and acutely angled to said longitudinal axis.

5. The boring tool of claim 4, wherein said cam follower means comprises two parallel cylindrical surfaces slidably engaged with said two flat surfaces, whereby axial movement of said sleeve causes said flat surfaces to exert cam forces on said cylindrical surfaces.

6. The boring tool of claim 1, wherein said means for opening and closing said clamping unit comprises a threaded rod centered in the clamping unit, a rotary nut threadably engaged with said rod, a rotary shaft located on said longitudinal axis, and a universal driving connection between said shaft and said nut, whereby the nut rotational axis can be oblique to the shaft axis without disrupting the drive connection from the shaft to the nut.

7. The boring tool of claim 1, wherein said clamping unit has two arcuate slots centered on the boring bar longitudinal axis at the zone where said mounting flange joins said housing; said arcuate slots forming two diametrically spaced neck sections that collectively define the aforementioned transverse axis.

8. The boring tool of claim 1, wherein said cutter holding means comprises a tubular mounting section having an outer side surface and an inner side surface; said clamping unit comprising a plurality of wedge lock elements movable away from the boring bar longitudinal axis for locking engagement with the inner side surface of said tubular section.

9. The boring tool of claim 8, wherein said means for opening and closing the clamping unit comprises an axially movable rod, and cam means carried by said rod in slidable engagement with said wedge lock elements.

10. The boring tool of claim 1, wherein there are three cutter elements; two of said cutter elements being located on an imaginary diametrical line extending parallel to the aforementioned transverse axis; the third cutter element being located on an imaginary radial line extending normal to said diametrical line.

11. The boring tool of claim 1, wherein the cutting planes of said first and second cutter elements are axially offset from each other.

12. The boring tool of claim 1, wherein each cutter element has a cutting tip spaced radially from the boring bar longitudinal axis; the radial spacing of the cutting tip for said first cutter element being slightly less than the radial spacing of the cutting tip for said second cutter element.

13. The boring tool of claim 1, wherein said clamping unit has a neutral unstressed position wherein all of said cutter elements are precluded from engagement with the work piece; said clamping unit being tiltable in one direction to bring said first cutter element into position for performing a machining operation; said clamping unit being tiltable in a second direction to bring said second cutter element into position for performing a machining operation.

14. The boring tool of claim 13, wherein said clamping unit is resiliently biased to its neutral position in the absence of any force input from said tilting means.

* * * * *